(12) United States Patent
Ross

(10) Patent No.: US 10,594,606 B2
(45) Date of Patent: Mar. 17, 2020

(54) WIRED DATA-CONNECTION AGGREGATION

(71) Applicant: Vivint, Inc., Provo, UT (US)

(72) Inventor: Kevin Ross, Saratoga Springs, UT (US)

(73) Assignee: Vivint, Inc., Provo, UT (US)

( * ) Notice: Subject to any disclaimer, the term of this patent is extended or adjusted under 35 U.S.C. 154(b) by 79 days.

(21) Appl. No.: 15/483,853

(22) Filed: Apr. 10, 2017

(65) Prior Publication Data

US 2017/0279721 A1 Sep. 28, 2017

Related U.S. Application Data

(63) Continuation of application No. 14/522,489, filed on Oct. 23, 2014, now Pat. No. 9,621,465.

(51) Int. Cl.
*G01R 31/08* (2006.01)
*H04L 12/801* (2013.01)
*H04L 12/707* (2013.01)

(52) U.S. Cl.
CPC ............ *H04L 47/12* (2013.01); *H04L 45/22* (2013.01)

(58) Field of Classification Search
CPC .......... G01R 31/08; H04J 3/24; H04L 12/801; H04L 12/707; H04L 12/28; H04L 1/00; H04W 4/00
USPC ................... 709/223, 250; 370/329, 338, 341
See application file for complete search history.

(56) References Cited

U.S. PATENT DOCUMENTS

| 7,590,055 B2 * | 9/2009 | Segel ...................... H04L 45/22 370/228 |
| 7,805,156 B1 | 9/2010 | Allen et al. |
| 8,369,349 B2 | 2/2013 | Martinez et al. |
| 8,385,224 B2 * | 2/2013 | Pasko .................... H04W 28/20 370/252 |
| 8,433,783 B2 * | 4/2013 | Jackowski .............. H04L 47/19 370/469 |
| 8,514,701 B2 | 8/2013 | Kalla et al. |
| 8,737,221 B1 | 5/2014 | Jilani et al. |
| 8,788,640 B1 | 7/2014 | Masters |
| 8,989,010 B2 | 3/2015 | Beheshti-Zavareh et al. |
| 9,621,465 B2 * | 4/2017 | Ross ....................... H04L 47/12 |
| 9,792,308 B2 | 10/2017 | Fallon et al. |
| 9,922,347 B1 | 3/2018 | Burcham et al. |
| 2004/0037321 A1 | 2/2004 | Miura |
| 2006/0039291 A1 | 2/2006 | Sinha et al. |
| 2006/0165009 A1 | 7/2006 | Nguyen et al. |
| 2008/0037478 A1 | 2/2008 | Na et al. |
| 2008/0133996 A1 | 6/2008 | Naka et al. |
| 2010/0241759 A1 | 9/2010 | Smith et al. |

(Continued)

OTHER PUBLICATIONS

PCT International Search Report for International Application No. PCT/US2015/056924, dated Feb. 1, 2016 (3 pp.).

*Primary Examiner* — Hanh N Nguyen

(74) *Attorney, Agent, or Firm* — Holland & Hart, LLP

(57) ABSTRACT

According to at least one embodiment, a computer-implemented method to transmit data is described. The data being transmitted over a wired data-connection may be identified. The identified data may be parsed into two or more parts. A first part of the identified data may be transmitted over a primary wired data-connection. A second part of the identified data may be transmitted over an auxiliary wired data-connection. The auxiliary wired data-connection may be connected to the primary wired data-connection via a wireless data-connection.

18 Claims, 6 Drawing Sheets

(56) References Cited

U.S. PATENT DOCUMENTS

| | | |
|---|---|---|
| 2010/0293277 A1 | 11/2010 | Rooks et al. |
| 2013/0111038 A1 | 5/2013 | Girard |
| 2013/0286941 A1 | 10/2013 | Lee et al. |
| 2014/0086256 A1 | 3/2014 | Raniere |
| 2014/0154973 A1 | 6/2014 | Schoppmeier |
| 2014/0161055 A1 | 6/2014 | Chitrapu et al. |
| 2014/0269461 A1 | 9/2014 | Mehta |
| 2015/0312337 A1 | 10/2015 | Keremane et al. |

\* cited by examiner

WIRED DATA-CONNECTION AGGREGATION

CROSS-REFERENCE TO RELATED APPLICATIONS

The present Application is a continuation of U.S. patent application Ser. No. 14/522,489, titled: "Wired Data-Connection Aggregation," filed on Oct. 23, 2014. The disclosure of which is incorporated by reference herein in its entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies.

SUMMARY

According to at least one embodiment, a computer-implemented method to transmit data is disclosed. The data being transmitted over a wired data-connection may be identified. The identified data may be parsed into two or more parts. A first part of the identified data may be transmitted over a primary wired data-connection. A second part of the identified data may be transmitted over an auxiliary wired data-connection. The auxiliary wired data-connection may be connected to the primary wired data-connection via a wireless data-connection.

In some embodiments, the two or more parts of identified data may be aggregated after transmitting the two or more parts to an end destination. It may be determined when the identified data exceeds a capacity of the primary wired data-connection. The primary wired data-connection may be at a primary location and the auxiliary wired data-connection may be at a secondary location. In some embodiments, the one or more auxiliary wired data-connections may be coupled to the primary wired data-connection using one or more wireless data-connections. The one or more auxiliary wired data-connections may be located at one or more secondary locations.

In some embodiments, more than one piece of data being transferred across a data-connection may be identified. The data from the primary location may be prioritized over data from the secondary location based at least in part on the identifying. The second part of the identified data may be redirected to a second auxiliary connection based at least in part on the prioritizing. A part of the identified data may be retransmitted if not received by an end destination.

In some embodiments, a size of the identified file may be compared to a bandwidth of the primary wired data-connection. A transfer time value of the transmitted identified data over the primary wired data-connection may be calculated based at least in part on the comparing. The identified data may be divided into two or more parts based at least in part on the calculating. In some instances, transmitting the second part of the identified data over the auxiliary wired data-connection may reduce the calculated transfer time value.

According to another embodiment, an apparatus to transmit data is also described. The apparatus may include a processor, a memory in electronic communication with the processor and instructions stored on the memory of the processor. The processor may execute the instructions to identify data being transmitted over a wired data-connection and parse the identified data into two or more parts. The processor may execute the instructions to transmit a first part of the identified data over a primary wired data-connection and transmit a second part of the identified data over an auxiliary wired data connection connected to the primary wired data-connection via a wireless data-connection.

According to another embodiment, a non-transitory computer-readable medium that may store instructions executable by a processor is also described. The instructions to identify data being transmitted over a wired data-connection and parse the identified data into two or more parts. The instructions may transmit a first part of the identified data over a primary wired data-connection and transmit a second part of the identified data over an auxiliary wired data connection connected to the primary wired data-connection via a wireless data-connection.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
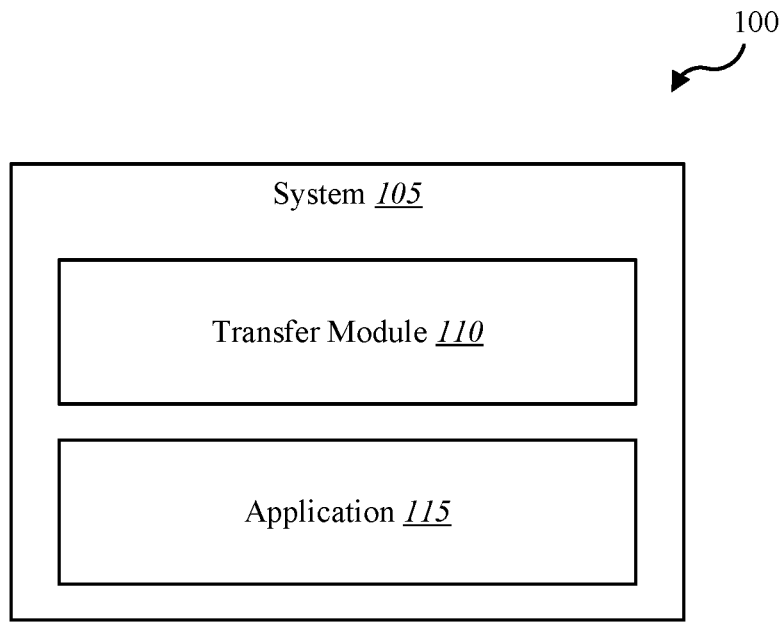
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to transferring data. More specifically, the systems and methods described herein relate to latency in transmitting data over a wired data-connection. For example, a wireless mesh or network may overlay several wired data-connections in a load sharing or bonding capacity for improved data transfer performance and redundancy.

Multiple wired-data connections may be aggregated to increase the capacity of transferring data. All wired data-connections have capacity limitations. Wired data-connections may comprise Ethernet, digital subscriber line (DSL), telephone lines, coaxial cables, fiber optic networks, and the like. DSL may transmit from 256 Kbits per second to over 100 Mbit per second. Ethernet may transmit approximately 100 gigabits per second. However, with the advance of technology has come an increase in the size of data being transmitted. Electronic books can range in size from 1 to 5 megabits. A HD movie can be approximately 8-15 gigabits, a Blu-ray movie can be 20-25 gigabits. An MP3 file can comprise 4 megabits. Image file sizes may range over 1 megabit depending on the quality of the image. Software packages may range from small, such as approximately 1 Megabit, to quite large, over 400 Megabit. When transmitting one or multiple instances of these large files, a user may experience latency or lagging. In some instances, a user may be transmitting more data than a wired-connection may transmit at a single time. This may result in delays in transmission, latency, and/or lagging.

FIG. 1 is a block diagram illustrating one embodiment of an environment 100 in which the present systems and methods may be implemented. In some embodiments, the systems and methods described herein may be performed at least in part on or using a system 105. The environment 100 may include the system 105, a transfer module 110, and an application 115.

The transfer module 110 may transmit data between two locations, between multiple locations, or the like. Data may comprise raw data, files, software packages, multiple pieces of data, and the like. In some embodiments, the location may comprise a home location, a business location, a server, and the like. The transfer module 110 may transfer files over a wired data-connection. The wired data-connection may be a telephone line, DSL, coaxial cable, fiber optic network, and the like as described previously. In some embodiments, the wired data-connection may have a maximum transfer capacity. For example, different data-connections may have different transfer rates. The transfer rates may be expressed in bits per second. The bits per second may determine how quickly a file may be transferred based on the type of connection. In some instances, the file may be too large for a particular connection and may cause latency, a connection time-out, and/or a lengthy transfer time.

To effectuate an improved data transfer experience, the transfer module 110 may parse the data being transferred. For example, the transfer module 110 may divide the data into two or more smaller sized parts and transfer the smaller parts. After the smaller parts are transferred to their end destination, the data may be recompiled or aggregated back into its original state. The transfer module 110 may transfer the data over multiple wired data-connections. For example, the transfer module 110 may couple multiple wired data-connections over a mesh network. The mesh network may be a wireless network.

The application 115 may interface with the transfer module 110. Examples of the application 115 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. The web browser may be a software application for retrieving, presenting, and/or traversing information over a network (e.g. network 210, see FIG. 2). In some embodiments, the web browser may construct files. Examples of a web browser include Firefox, Internet Explorer, Google Chrome, Opera, Safari and the like. In some embodiments, the application 115 may interface with a function of a server (e.g. server 205, see FIG. 2).

Figure 2:
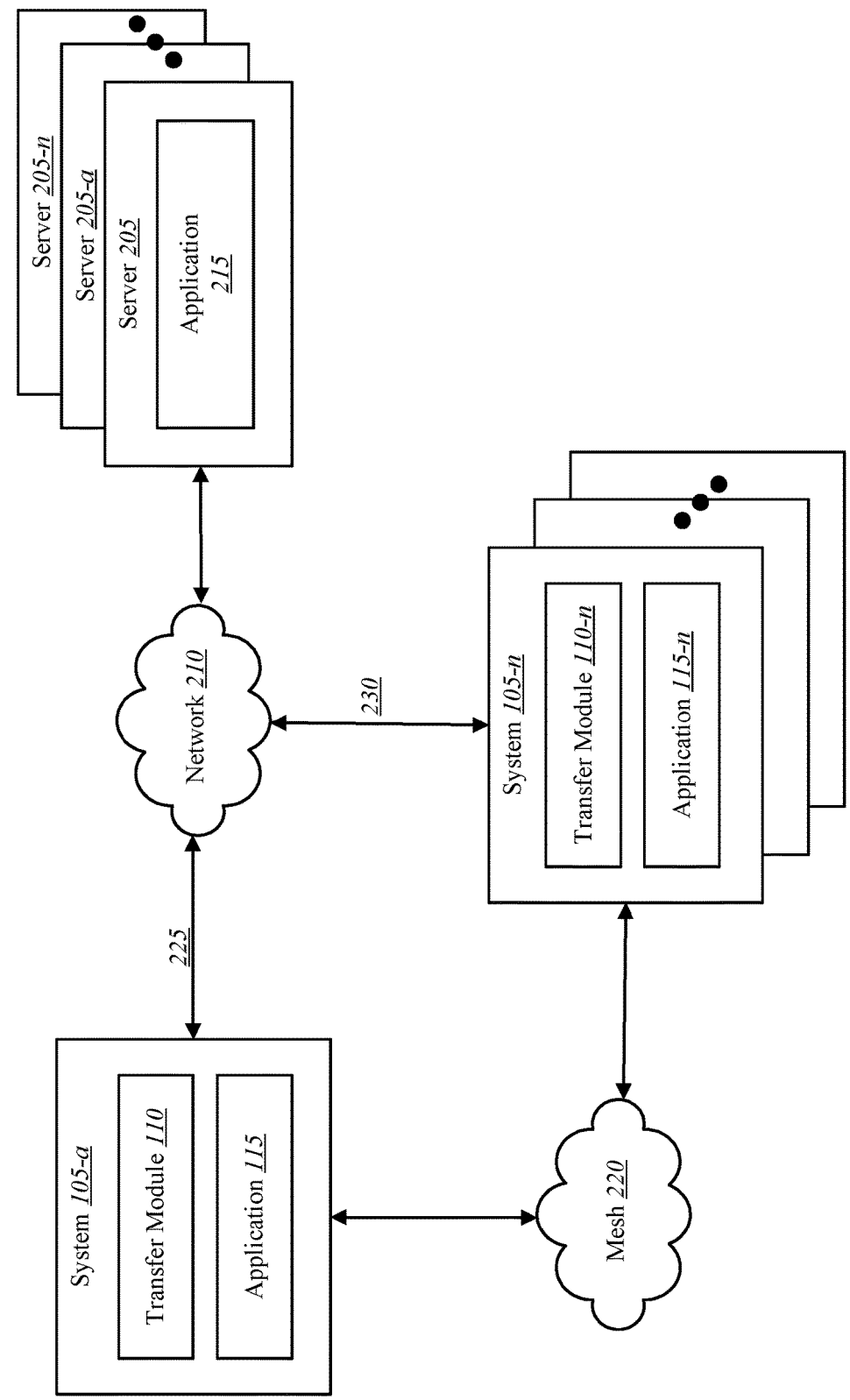
FIG. 2 is a block diagram of another environment in which the present systems and methods may be implemented.

FIG. 2 is a block diagram illustrating one embodiment of an environment 200 in which the present systems and methods may be implemented. The environment 200 may include a system 105-*a*, a server 205, a network 210, and a mesh 220. In some embodiments, the systems and methods described herein may be performed on the system 105-*a*, on the server 205, on the system 105-*a* and the server 205 or collectively on the environment 200. The system 105-*a* may be one example of the system 105 shown in FIG. 1. In some embodiments, the environment 200 may include multiple systems 105-*a*, 105-*n*. In some embodiments, the environment 200 may additionally include multiple servers 205, 205-*a*, 205-*n*.

The server 205 may serve one or more privileged services. For example, the server 205 may be one of an application server, catalog server, database server, content delivery network, proxy server, web server, or the like. In some embodiments, multiple servers 205, 205-*a*, 205-*n* may be present. The multiple servers 205-*n* may comprise a variety of types of servers. For example, the environment 100 may comprise at least a content delivery network, a web server, and an application server. A content delivery network may be a distributed system of servers in multiple data centers across the internet. The content delivery network may provide high availability and high performance of content to users.

In some embodiments, the server 205 may include an application 215. The application 215 may be similar to the application 115. For example, the application 215 may interface with the server 205 and/or the transfer module 110. Examples of the application 215 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. The web browser may be a software application for retrieving, presenting, and/or traversing information over the network 210. In some embodiments, the web browser may construct files. Examples of a web browser include Firefox, Internet Explorer, Google Chrome, Opera, Safari and the like. In some embodiments, the application 215 may interface with a function of a server 205.

In some cases, the system 105-a may connect to the server 205 via the network 210. Examples of the network 210 include any combination of local area networks (LAN), wide area networks (WAN), virtual private networks (VPN), wireless networks (using 802.11, for example), cellular networks (using 3G and/or LTE, for example), etc. In some configurations, the network 210 may include the internet. Thus, network 210 may include one or more gateway devices, access points, routers, switches, dynamic host configuration protocol (DHCP) servers, etc., that enable computing devices to connect to the internet.

In some embodiments, the system 105-a may be a primary location and may connect to the network 210 via a primary wired data-connection 225. The primary wired data-connection 225 may comprise an Ethernet, DSL, telephone line, coaxial cable, fiber optic network, and the like. The primary wired data-connection may have a bandwidth capacity. The bandwidth capacity may be expressed in bits per second or some multiple thereof. The primary wired data-connection 225 may transmit data between the system 105-a and the network 210.

In some cases, the system 105-a may additionally connect to other systems 105-n, or secondary locations, via an additional mesh 220. The mesh 220 may include any combination of wireless connections. The mesh 220 may comprise a wireless personal area network (WPAN), a wireless local area network (WLAN), a wireless mesh network, a wireless metropolitan area network, a wireless wide area network, wireless links, cellular networks, global area network, Bluetooth, and the like. The environment 200 may have secondary systems 105-n which may be interconnected via the mesh 220.

The secondary systems 105-n may connect to the network via an auxiliary wired data-connection 230. Similar to the primary wired data-connection 225, the auxiliary wired data-connection 230 may comprise an Ethernet, DSL, telephone line, coaxial cable, fiber optic network, and the like. The primary wired data-connection may have a bandwidth capacity. The bandwidth capacity may be expressed in bits per second or some multiple thereof. The auxiliary wired data-connection 230 may transmit data between the system 105-n and the network 210.

Figure 3:
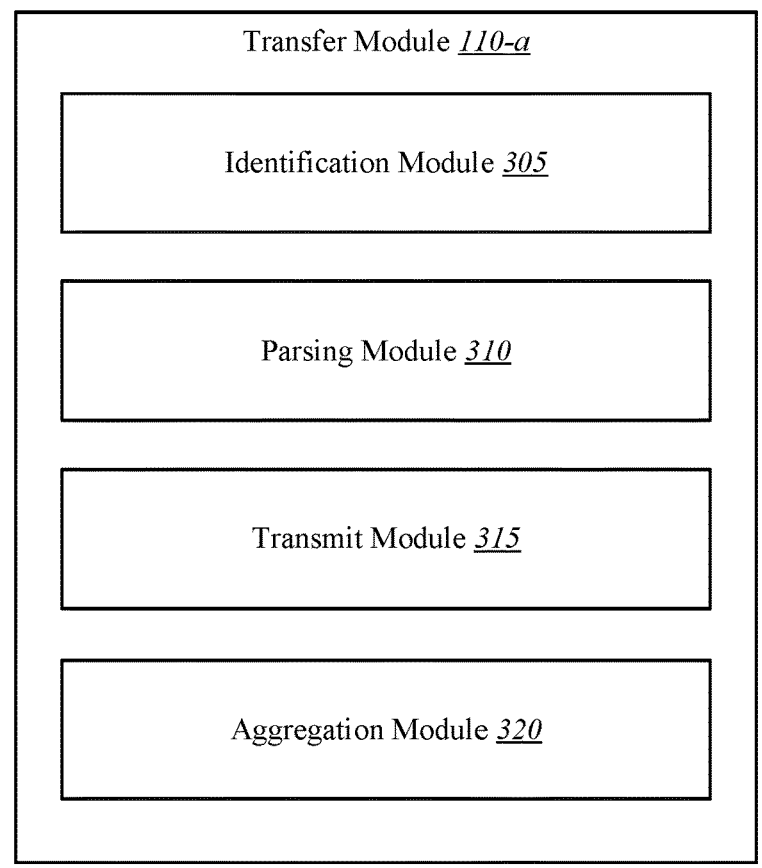
FIG. 3 is a block diagram of an example transfer module of the environments shown in FIGS. 1 and 2.

FIG. 3 is a block diagram 300 illustrating one example of a transfer module 110-a. The transfer module 110-a may be one example of the transfer module 110 depicted in FIGS. 1 and/or 2. As depicted, the transfer module 110-a may include an identification module 305, a parsing module 310, a transmit module 315, and an aggregation module 320. The transfer module 110-a may include additional modules and capabilities in other embodiments. Similarly, the transfer module 110-a may include fewer number of modules and functionality than that which is described with reference to FIG. 3.

In some embodiments, the identification module 305 may identify data being transmitted over a wired data-connection. The data may be transmitted from a primary location over a primary wired data-connection. The identification module 305 may identify which data to parse and transfer over one or more connections. For example, the identification module 305 may identify when a large data set is attempting to be transferred between two locations based on one or more parsing factors. The one or more parsing factors may comprise a size of the data, availability of one or more auxiliary connections, an estimated transfer time, and the like.

For example, the identification module 305 may comprise information regarding a transfer rate of the primary wired data-connection. The identification module 305 may compare the size of the identified data to a transfer rate and determine an estimated transfer time of the identified data. In some embodiments, the estimated transfer time may be greater than a predetermined acceptable data transfer time. In further embodiments, the estimated transfer time may cause a connection to time-out. In other embodiments, the estimated transfer time may be greater than a desirable transfer time set by a user, server, or the like.

The identification module 305 may determine the available bandwidth of the primary wired data-connection. For example, a user may be transferring an excessive number of files. The aggregate size of the numerous files may exceed a bandwidth of the primary connection. The aggregate size of the files may additionally exceed an estimated transfer time to complete the transmission of the multiple files.

The identification module 305 may also determine the availability of one or more auxiliary connections. An auxiliary connection may consist of a connection between a secondary location (e.g. system 105-n) and the network (e.g. network 210). The auxiliary connection may comprise a wired data-connection. The auxiliary connections may be connected to the primary wired data-connection via a mesh network (e.g. mesh 220). The identification module 305 may identify a number of auxiliary connections connected to the primary connection and may additionally determine a bandwidth availability of the one or more auxiliary connections. The bandwidth may comprise the amount of available or consumed data communication resources of the auxiliary connections. The bandwidth may be expressed in bits per second or multiples of a bits per second bandwidth.

The parsing module 310 may divide the identified data into two or more parts. For example, the parsing module 310 may split the data into subparts to decrease a transfer time of the data. If the identified data is too large, the data may be parsed into two or more smaller pieces. If the data consists of multiple pieces of data that combined exceed a bandwidth of the primary data connection, the multiple pieces of data may be divvied into multiple parts to effectuate a decreased transfer time. The parsing module 310 may consist of a code to generate a file which may reconstitute the data once transmission is complete. The code may be impregnated into one of the parsed parts or may be transmitted as a separate file.

The transmit module 315 may effectuate the physical transfer of the data. The transmit module 315 may either transmit the data between a network and a system using the primary data connection and one or more auxiliary connections. Additionally, the transmit module 315 may transfer data between the system and a server using the primary connection and one or more auxiliary connections. For example, the transmit module 315 may send a part of data over the primary wired data-connection. The transmit module 315 may then send one or more additional parts of data over the mesh network to one or more secondary locations. The transmit module 315 may transmit the pieces of data from the one or more secondary locations to the end destination using one or more auxiliary wired data-connections.

If one or more pieces of data have not been received by the end location, the transmit module 315 may resend the pieces of identified data. The transmit module 315 may try to resend the data using the one or more auxiliary connections. Conversely, the transmit module 315 may resend the piece of data using the primary wired data-connection if the primary wired data-connection has bandwidth availability.

In some embodiments, while a piece of data is being transmitted using an auxiliary connection, more pieces of data originating from the secondary location may interrupt or consume unanticipated bandwidth on the auxiliary connection. The transmit module 315 may prioritize data originating from the secondary location that is being transferred on the auxiliary connection. In those embodiments, the transmit module 315 may redirect one or more pieces of data to a second auxiliary wired data-connection to effectuate data transfer.

The aggregation module 320 may recompile the parts of the data once the two or more pieces have reached their end destination. For example, the aggregation module 320 may receive the code and/or instructions for recompiling the data. The aggregation module 320 may use the code and/or instructions to compile the data into its original state prior to being split into multiple pieces. Once the aggregation module 320 has completed recompiling the data, the data may be presented to the end user. The end user may be a server, user, or the like.

Figure 4:
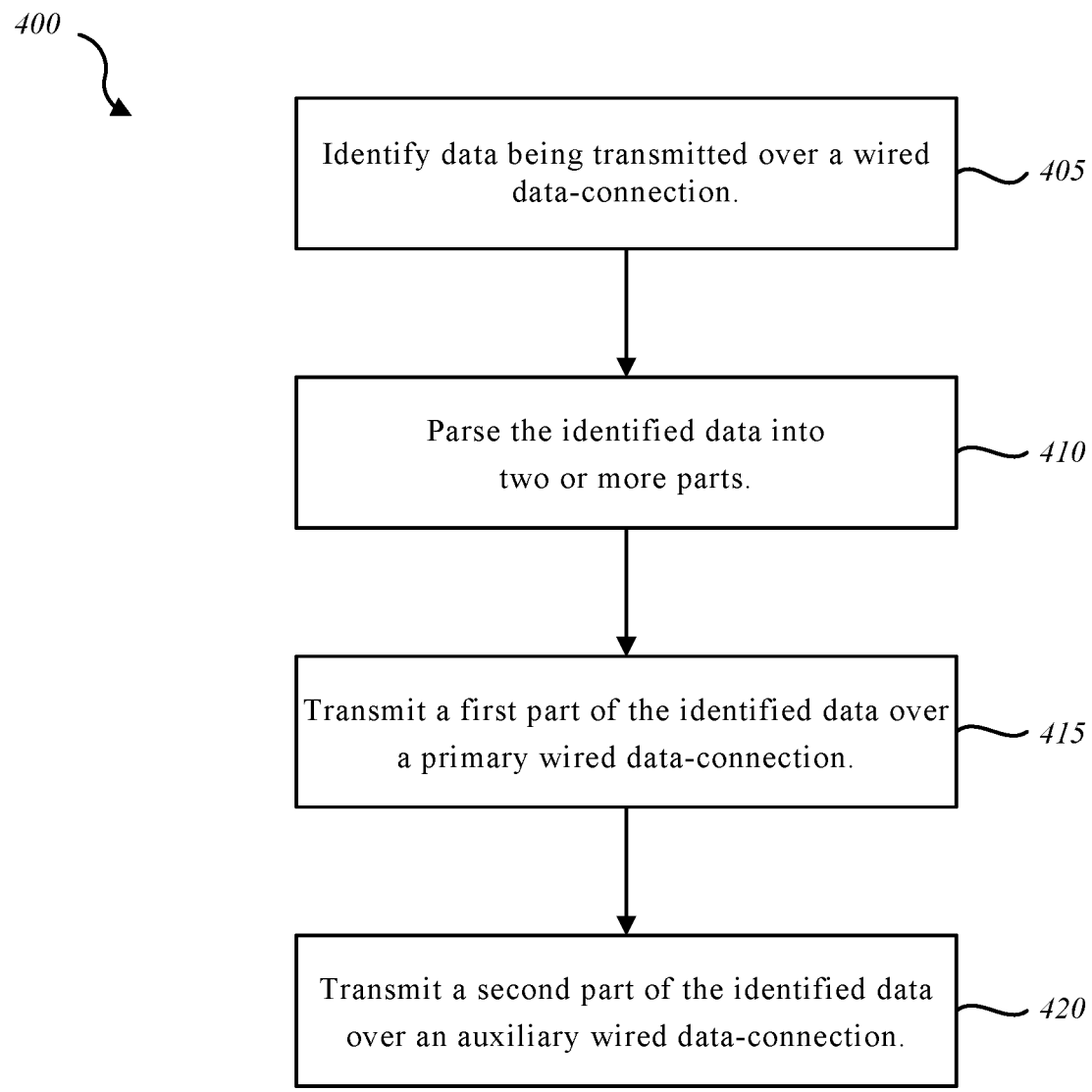
FIG. 4 is a flow diagram illustrating an exemplary method for transmitting data.

FIG. 4 is a flow diagram illustrating one embodiment of a method 400 for transmitting data. In some configurations, the method 400 may be implemented in whole or in part by the transfer module 110 of the system 105 shown in FIGS. 1 and/or 2. In further embodiments, the method 400 may be performed generally by the system 105 shown in FIGS. 1 and/or 2, or even more generally by the environments 100, 200 shown in FIGS. 1 and/or 2.

At block 405, data being transmitted over a wired data-connection may be identified. The data may be an individual file, a group of files, generic data and/or the like. The file may be transferred between two locations. The locations may comprise a business, home location, a server, a network, and the like. For example, the data may be transferred between a home location and a server, between two servers, between two businesses, or the like. The data may originate from a primary location and may be attempted to be transmitted over a primary wired-data connection. The data may be of a size such that it exceeds a capacity of the primary wired data-connection.

At block 410, the identified data may be parsed into two or more parts. For example, the identified data may exceed the bandwidth capacity of the primary data connection. Dividing the data into two or more pieces may result in smaller files or pieces of data which may be transmitted faster. The pieces of data may be equivalent in size. For example, the data may be halved if transmitting over two connections, trifurcated if transmitting over three lines, and the like. In other embodiments, the data may be parsed into non-equivalent pieces. For example, a first piece may be larger than a second piece, or multiple pieces may be of varying sizes depending upon the availability of auxiliary network bandwidths.

At block 415, the first part of the identified data may be transmitted over the primary wired data-connection. The primary wired data-connection may connect the primary location and a network. The primary wired-data connection may additionally or alternatively connect the primary location and a server. The identified data may be transmitted between the network and the system, between the server and the system, or any other known combination. In some embodiments, the data may be sent to another location by means of the server. The first part of the identified data may consume a large portion of the bandwidth on the primary wired data-connection. In some embodiments, the data may consume any available bandwidth on the primary connection.

At block 420, the second part of the identified data may be transmitted over an auxiliary wired-data connection. The auxiliary wired data-connection may be connected to the primary wired data-connection via a mesh network. The mesh network may comprise wireless technology. The second part of the identified file may not consume the entire bandwidth of the auxiliary connection. Rather, the second piece of data may reduce the size of the overall data enough to allow for an effective transfer of the information over a wired data-connection. In some embodiments, additional parsed pieces of data may continue to be transferred to auxiliary wired data-connections via the wireless mesh network.

Figure 5:
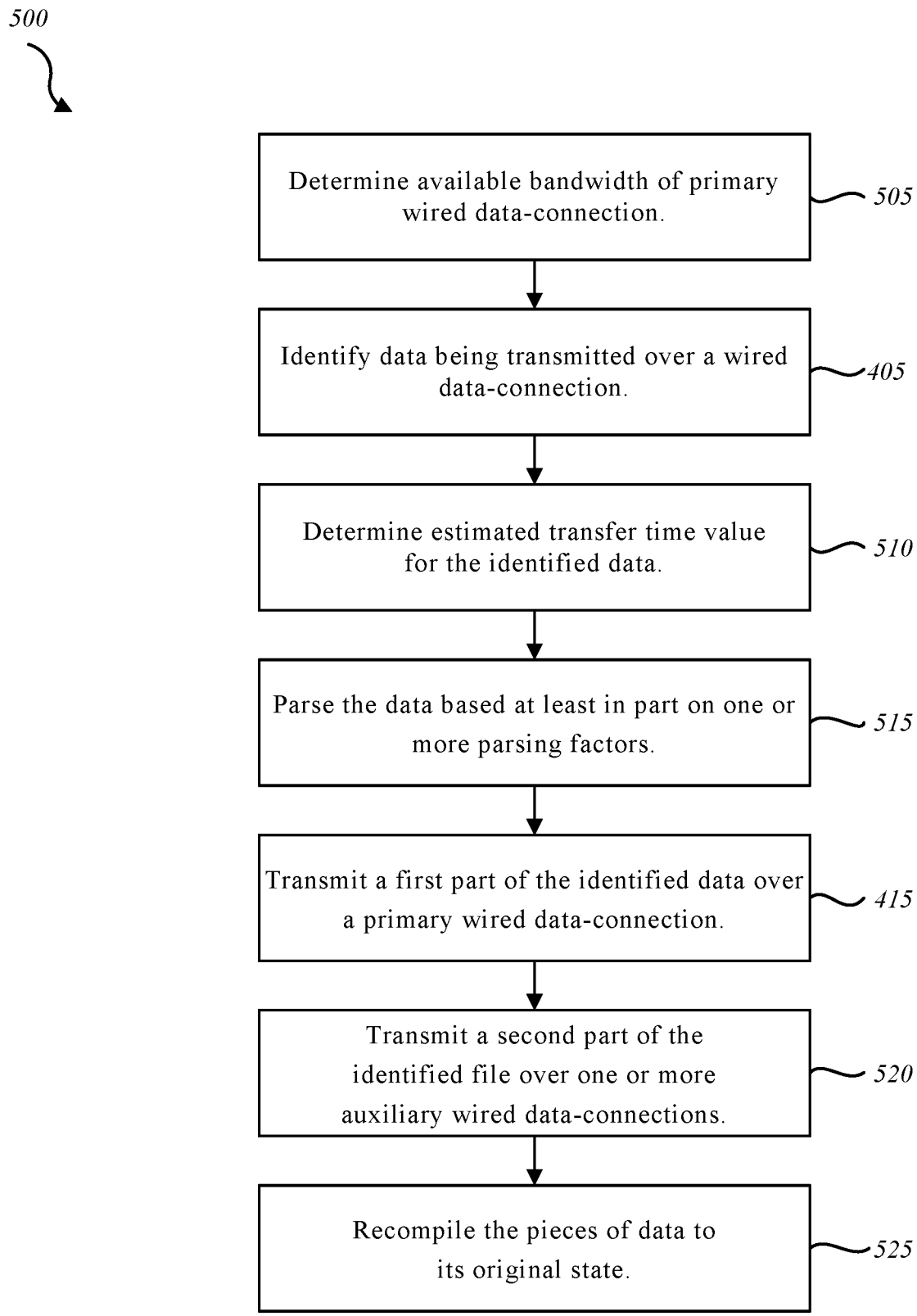
FIG. 5 is another flow diagram illustrating another exemplary method for transmitting data.

FIG. 5 is a flow diagram illustrating one embodiment of a method 500 for transmitting data. In some configurations, the method 500 may be implemented in whole or in part by the transfer module 110 of the system 105 shown in FIGS. 1 and 2. In further configurations, the method 500 may be performed generally by the system 105 shown in FIGS. 1 and/or 2, or even more generally by the environments 100, 200 shown in FIGS. 1 and/or 2.

At block 505, a bandwidth availability of a primary wired data-connection may be determined. For example, the primary wired data-connection may comprise one of a telephone line, Ethernet, coaxial cable, and the like. Depending upon the type of connection, the speed of the connection purchased, the servicing company, among other factors, the total bandwidth capability and data transfer speed for each wired data-connection may differ. Additionally, the bandwidth availability may differ based on other data being transferred across the primary wired data-connection. For example, if a user is transferring numerous pieces of data, the bandwidth capability may change based on the amount of bandwidth consumed by data transfer. The bandwidth availability amount may be determined by subtracting an amount of current data traffic from a total capability of the connection. Therefore, a bandwidth capability for the primary connection may be determined for each individual connection. Additional calculations may also need to occur.

Then, at block 405, data may be identified that is being transmitted over the primary wired data-connection. Identifying the data may comprise identifying a quantity of data, a type or kind of data, a size of the data, and the like. At block 510, an estimated transfer time value for the identified data may be determined. The estimated transfer time value may be calculated by dividing the size of the data by the bandwidth availability of the primary connection. The quotient may result in an estimated transfer time value in seconds. In some embodiments, other calculations may be necessary to determine an estimated transfer time value.

At block 515, the data may be parsed based at least in part on one or more parsing factors. The parsing factors may comprise one of a size of the identified data, an estimated transfer time value, the availability of auxiliary connections, type of data, and the like. For example, the system may have a predetermined data size which may automatically parse the data. For example, total data size over 4 megabytes. In other embodiments, the total data size may vary based upon user and the user's connection type. For example, a user with a dial-up, telephonic internet connection may have a smaller predetermined data size than a user with an Ethernet connection.

The estimated transfer time value may also result in a parsing of the data. For example, the estimated transfer time value may be greater than a predetermined value of maximum allowable transfer time. The predetermined maximum allowable transfer time value may be based upon a system default, a potential timeout or latency of connectivity, a user preset, and the like. For example, the system default may be an estimated transfer time value of approximately 60 seconds. The system default may be based on system capability, or on user feedback of desirable transfer time.

The type of data may also be a parsing factor. For example, some types of data may not be desirable to parse. For example, streaming movie content may be difficult to effectively parse, transfer over multiple connections, and then recompile for an acceptable or desirable viewing experience. In other embodiments, other types of data may be transferred much quicker if parsed and transferred over multiple data connections. For example, still images, software packages, full movie files, music files, and the like may all be large in size but easily parsed, transferred, and recompiled.

The potential for latency, lagging, or time out may also be a parsing factor. For example, the connection may have multiple pieces of data in queue to transfer and the size of the data may cause a delay in the transferring of data. The data may also be too large to effectively transfer over the available bandwidth and may cause the connection to timeout. Connection timeout may occur when the desired transfer of a file is not completed within a predetermined time frame.

Once the data is parsed, at block 415, a first part of the data may be transmitted over the primary wired data-connection. Then, at block 520 one or more additional pieces of data may be transferred over one or more auxiliary wired data-connections. The primary and auxiliary wired data-connections may be integrated over a wireless mesh network. In some embodiments, more than one piece of data may transferred across a wired data-connection. In those embodiments, the data sent from a primary location may be prioritized over data being transmitted from a secondary location. For example, a piece of data may be transferred across an auxiliary wired data-connection. However the auxiliary wired data-connection may be a second user's primary wired data-connection. If the second user is attempting to transmit data across that particular wired data-connection, the second user's data may be prioritized. This may comprise delaying the transmission of the piece of data, or redirecting the second piece of data to a second auxiliary wired data-connection.

At block 525, the pieces of data may be recompiled into its original state. For example, the different pieces of parsed data may be reconstituted into its state prior to being parsed. A series of instructions or a recompilation file may be transferred either in conjunction with or separately from the parse data. The instructions may contain a series of directions on how to recompile the data. The data may be recompiled prior to presenting the data to the end user. For example, the recompilation of the data may occur as a hidden action from the user such that the user is unaware that the parsing and recompiling is taking place.

Figure 6:
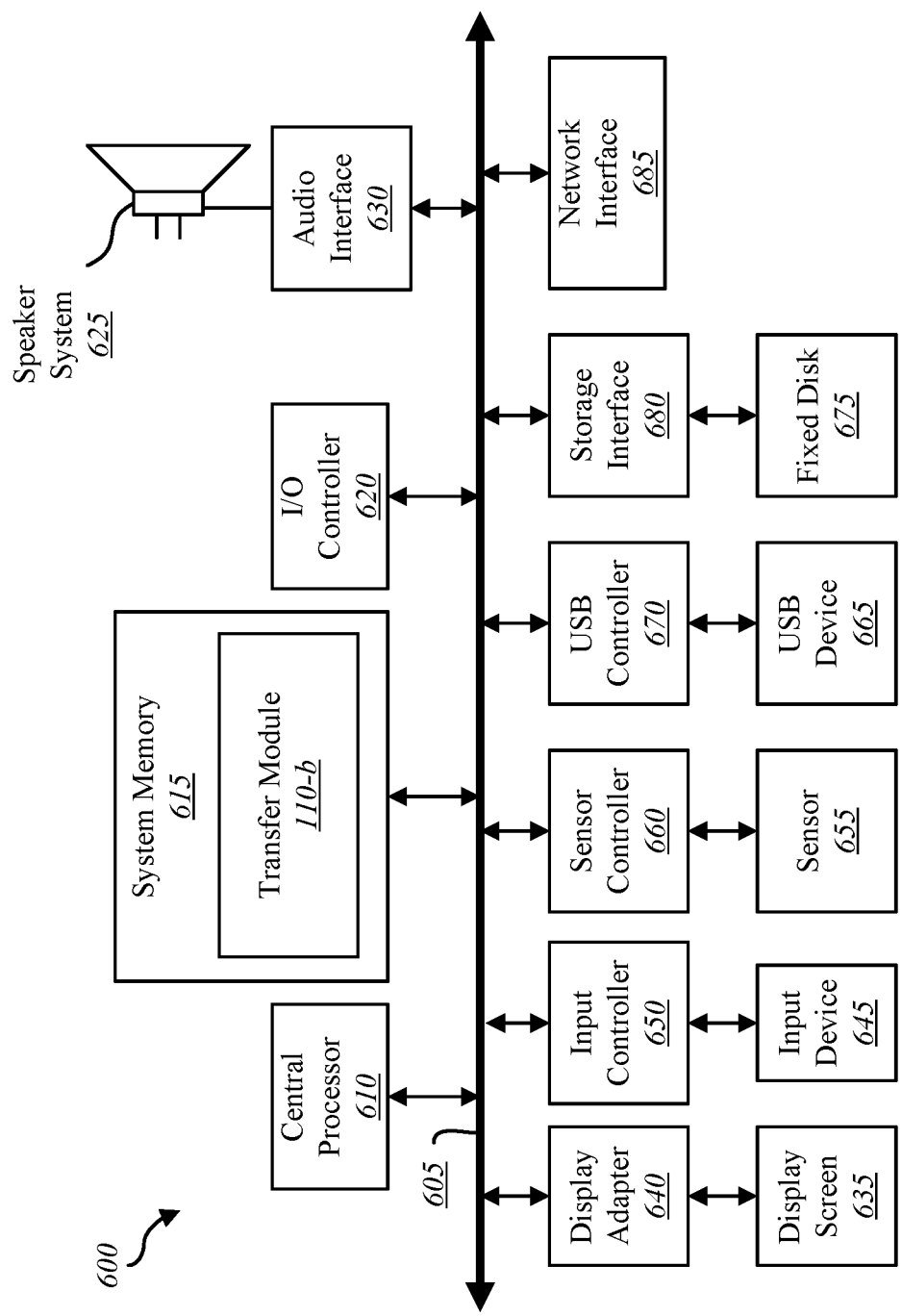
FIG. 6 is a block diagram of a computer system suitable for implementing the present systems and methods of FIGS. 1-5.

FIG. 6 depicts a block diagram of a controller 600 suitable for implementing the present systems and methods. In one configuration, the controller 600 may include a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, a transfer module 110-b to implement the present systems and methods may be stored within the system memory 615. The transfer module 110-b may be an example of the transfer module 110 illustrated in FIGS. 1, 2, and/or 3. Applications (e.g., application 115 and/or 215) resident with controller 600 are generally stored on and accessed via a non-transitory computer readable medium, such as a hard disk drive (e.g., fixed disk drive 675) or other storage medium. Additionally, applications can be in the form of electronic signals modulated in accordance with the application and data communication technology when accessed via the network interface 685.

Storage interface 680, as with the other storage interfaces of controller 600, can connect to a standard computer readable medium for storage and/or retrieval of information, such as a fixed disk drive 675. The fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk drive 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for electronic communication, comprising:
   identifying, by a first computing device, data to be transmitted from the first computing device to a server via a first wired connection between the first computing device and the server;
   identifying, by the first computing device, an availability of a second device having capacity to transmit at least some of the data from the second device to the server via a second wired connection between the second device and the server;
   determining, by the first computing device, a bandwidth availability of the first wired connection between the first computing device and the server and a bandwidth availability of the second wired connection between the second device and the server based at least in part on identifying the availability of the second device;
   dividing, by the first computing device, the data into a first portion to be transmitted to the server via the first wired connection and a second portion to be transmitted to the server via a wireless connection between the first computing device and the second device and the second wired connection between the second device and the server;
   comparing a size of the data to a transfer rate of the first wired connection to determine an estimated transfer time of transmitting the data over the first wired connection; and
   transmitting, by the first computing device, the first portion of the data to the server via the first wired connection and the second portion of the data to the second device via the wireless connection.

2. The method of claim 1, further comprising:
   determining that the size of the data exceeds a size threshold associated with the first wired connection of the first computing device, wherein identifying the second device is based at least in part on determining that the size exceeds the size threshold.

3. The method of claim 1, further comprising:
   determining that the estimated transfer time of transmitting the data via the first wired connection exceeds a transfer time threshold associated with the first wired connection of the first computing device, wherein identifying the second device is based at least in part on determining that the estimated transfer time exceeds the transfer time threshold.

4. The method of claim 3,
   wherein determining that the estimated transfer time exceeds the transfer time threshold is based on the comparison.

5. The method of claim 1, wherein:
   the first portion of the data is transmitted over the first wired connection at the same time that the second portion of the data is transmitted over the wireless connection.

6. The method of claim 1, further comprising:
   identifying a plurality of devices having wired communication resources for use by the first computing device, the plurality of devices being connected to the first computing device via the wireless connection, wherein the data is divided into a number of portions that includes the first portion and the second portion based at least in part on a number of the plurality of devices with available communication resources.

7. The method of claim 1, further comprising:
identifying a third device having capacity to transmit at least some of the data to the server via a third wired connection between the third device and the server;
wherein dividing the data further comprises: dividing, by the first computing device, the data into the first portion, the second portion, and a third portion, the third portion to be transmitted to the server via the wireless connection between the first computing device and the third device and the third wired connection between the third device and the server, wherein the third portion of the data is transmitted simultaneously with the first portion and the second portion of the data.

8. The method of claim 1, further comprising:
prioritizing the data of the first computing device data based at least in part on the estimated transfer time exceeding a threshold.

9. The method of claim 1, further comprising:
determining what communication resources of the second wired connection of the second device are available for use by the first computing device.

10. The method of claim 9, further comprising:
transmitting a request to the second device via the wireless connection inquiring what communication resources of the second device are available for use by the first computing device; and
receiving a response from the second device via the wireless connection indicating what communication resources are available for use by the first computing device.

11. The method of claim 1, further comprising:
establishing the wireless connection using a device-to-device mesh network.

12. An apparatus for electronic communication, comprising:
a processor;
memory in electronic communication with the processor; and
instructions stored in the memory and operable, when executed by the processor, to cause the apparatus to:
identify, by a first computing device, data to be transmitted from the first computing device to a server via a first wired connection between the first computing device and the server;
identify, by the first computing device, an availability of a second device having capacity to transmit at least some of the data from the second device to the server via a second wired connection between the second device and the server;
determine, by the first computing device, a bandwidth availability of the first wired connection between the first computing device and the server and a bandwidth availability of the second wired connection between the second device and the server based at least in part on identifying the availability of the second device;
divide, by the first computing device, the data into a first portion to be transmitted to the server via the first wired connection and a second portion to be transmitted to the server via a wireless connection between the first computing device and the second device and the second wired connection between the second device and the server;
compare a size of the data to a transfer rate of the first wired connection to determine an estimated transfer time of transmitting the data over the first wired connection; and
transmit, by the first computing device, the first portion of the data to the server via the first wired connection and the second portion of the data to the second device via the wireless connection.

13. The apparatus of claim 12, wherein the instructions are further executable by the processor to:
determine that the size of the data exceeds a size threshold associated with the first wired connection of the first computing device, wherein identifying the second device is based at least in part on determining that the size exceeds the size threshold.

14. The apparatus of claim 12, wherein the instructions are further executable by the processor to:
determine that the estimated transfer time of transmitting the data via the first wired connection exceeds a transfer time threshold associated with the first wired connection of the first computing device, wherein identifying the second device is based at least in part on determining that the estimated transfer time exceeds the transfer time threshold.

15. The apparatus of claim 14,
wherein determining that the estimated transfer time exceeds the transfer time threshold is based on the comparison.

16. The apparatus of claim 12, wherein:
the first portion of the data is transmitted over the first wired connection at the same time that the second portion of the data is transmitted over the wireless connection.

17. The apparatus of claim 12, wherein the instructions are further executable by the processor to:
identify a plurality of devices having wired communication resources for use by the first computing device, the plurality of devices being connected to the first computing device via the wireless connection, wherein the data is divided into a number of portions that includes the first portion and the second portion based at least in part on a number of the plurality of devices with available communication resources.

18. A non-transitory computer readable medium storing code for electronic communication, the code comprising instructions executable by a processor to:
identify, by a first computing device, data to be transmitted from the first computing device to a server via a first wired connection between the first computing device and the server;
identify, by the first computing device, an availability of a second device having capacity to transmit at least some of the data from the second device to the server via a second wired connection between the second device and the server;
determine, by the first computing device, a bandwidth availability of the first wired connection between the first computing device and the server and a bandwidth availability of the second wired connection between the second device and the server based at least in part on identifying the availability of the second device;
divide, by the first computing device, the data into a first portion to be transmitted to the server via the first wired connection and a second portion to be transmitted to the server via a wireless connection between the first computing device and the second device and the second wired connection between the second device and the server;

compare a size of the data to a transfer rate of the first wired connection to determine an estimated transfer time of transmitting the data over the first wired connection; and transmit, by the first computing device, the first portion of the data to the server via the first wired connection and the second portion of the data to the second device via the wireless connection.

\* \* \* \* \*